United States Patent
Webb et al.

(10) Patent No.: US 9,848,088 B2
(45) Date of Patent: Dec. 19, 2017

(54) VEHICLE COMMUNICATION SYSTEM

(71) Applicants: DENSO International America, Inc., Southfield, MI (US); DENSO CORPORATION, Kariya-shi, Aichi-ken (JP)

(72) Inventors: Gareth Webb, Farmington, MI (US); Jay Gloomis, Ann Arbor, MI (US); Cary Horvath, Dearborn, MI (US); Marc Arceo, Livonia, MI (US); Doua Vang, Waterford, MI (US)

(73) Assignees: DENSO International America, Inc., Southfield, MI (US); DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/086,901

(22) Filed: Mar. 31, 2016

(65) Prior Publication Data
US 2017/0289356 A1    Oct. 5, 2017

(51) Int. Cl.
*H04M 3/42* (2006.01)
*H04M 3/54* (2006.01)
*H04W 4/02* (2009.01)

(52) U.S. Cl.
CPC ............. *H04M 3/543* (2013.01); *H04W 4/02* (2013.01)

(58) Field of Classification Search
CPC ......... H04W 4/02; H04W 88/02; H04W 8/30; H04W 12/12; H04W 60/00; H04W 4/16; H04W 8/18; H04W 8/26; H04W 4/046; H04W 24/00; H04M 3/543; H04M 1/82; G08G 1/0962; H04L 65/1069; G06F 15/16; G06F 17/30; G01S 5/0263

USPC ................... 455/417, 455, 415; 701/41, 532
See application file for complete search history.

(56) References Cited

U.S. PATENT DOCUMENTS

| | | | |
|---|---|---|---|
| 7,865,282 B2 * | 1/2011 | Murlidar | G08G 1/0962 455/569.1 |
| 8,423,006 B2 | 4/2013 | Choi et al. | |
| 2005/0090236 A1 * | 4/2005 | Schwinke | H04M 1/82 455/415 |
| 2007/0086579 A1 * | 4/2007 | Lorello | H04M 3/42263 379/45 |
| 2011/0281562 A1 * | 11/2011 | Videtich | H04W 4/046 455/414.1 |
| 2012/0142367 A1 * | 6/2012 | Przybylski | H04W 4/046 455/456.1 |
| 2012/0289210 A1 * | 11/2012 | Choi | H04M 1/6075 455/414.1 |

(Continued)

FOREIGN PATENT DOCUMENTS

| | | | | | |
|---|---|---|---|---|---|
| KR | WO 2008143439 A1 | * | 11/2008 | | H04M 1/6075 |
| WO | WO 2014003797 A1 | * | 1/2014 | | H04W 8/30 |

*Primary Examiner* — Mahendra Patel
(74) *Attorney, Agent, or Firm* — Harness, Dickey & Pierce, PLC

(57) ABSTRACT

A vehicle communication system including a data communication module (DCM) that, upon detecting that a user's mobile telephone is not present onboard a vehicle, is configured to instruct a telecommunications server to forward calls made to the user's mobile telephone to the DCM of the vehicle. The DCM is further configured to instruct the telecommunications server to connect a telephone call that has been initiated by the user at the vehicle using the DCM of the vehicle.

18 Claims, 3 Drawing Sheets

(56) References Cited

U.S. PATENT DOCUMENTS

2015/0099515 A1* 4/2015 Kasravi .................. H04W 8/30
  455/435.1
2016/0105784 A1* 4/2016 Gellens ................ H04M 3/5116
  455/404.1

\* cited by examiner

VEHICLE COMMUNICATION SYSTEM

FIELD

The present disclosure relates to systems and methods for making telephone calls onboard a vehicle when a mobile telephone is not present in the vehicle.

BACKGROUND

This section provides background information related to the present disclosure, which is not necessarily prior art.

Vehicles are often equipped with a communications system that is able to connect to (pair with) a mobile telephone present within the vehicle to allow the mobile telephone to be accessed through the vehicle communications system for making and receiving telephone calls. When a telephone call is received by the mobile telephone, and the mobile telephone is present within the vehicle and paired with the communications system, the call will be announced (or will "ring") through a vehicle speaker, such as one or more speakers of the vehicle's audio system. Upon answering the call, the user will be able to hear the voice of the other person on the call through the vehicle speaker, and will be able to talk to the other person using a microphone mounted within the vehicle. The user can access the paired mobile telephone through the communications system of the vehicle to place calls as well.

While current communications systems are suitable for their intended use, they are subject to improvement. For example, because current vehicle communications systems require that the user's mobile telephone be present in the vehicle and paired with the system, the user cannot make or receive calls when the user does not have his/her mobile phone in the vehicle. Systems and methods for making telephone calls onboard a vehicle when a mobile phone is not present in the vehicle would therefore be desirable.

SUMMARY

This section provides a general summary of the disclosure, and is not a comprehensive disclosure of its full scope or all of its features.

The present teachings provide for systems and methods for making telephone calls onboard a vehicle when a mobile phone is not present in the vehicle. A vehicle communication system according to the present teachings includes a data communication module (DCM) that, upon detecting that a user's mobile telephone is not present onboard the vehicle, instructs a telecommunications server to forward calls made to the user's mobile telephone to the DCM. The DCM is further configured to instruct the telecommunications server to connect a telephone call that has been initiated by the user at the vehicle using the DCM.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
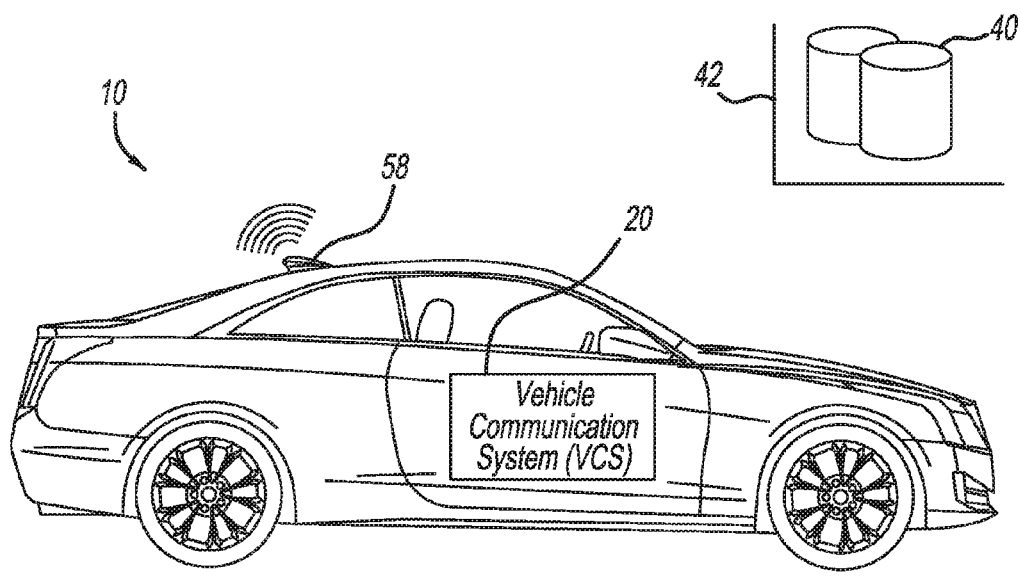
FIG. 1 illustrates a vehicle including a vehicle communication system according to the present teachings.

With initial reference to FIG. 1, a vehicle 10 including a vehicle communication system (VCS) 20 according to the present teachings is illustrated. The vehicle 10 is illustrated as a passenger vehicle for exemplary purposes only. The vehicle 10 can thus be any suitable vehicle, such as any suitable type of passenger vehicle, military vehicle, construction vehicle, mass transit vehicle, watercraft, aircraft, etc. The VCS 20 may also be used apart from a vehicle. For example, the VCS 20 may be installed in any building or stationary structure, such as at a home or office.

The VCS 20 is illustrated in detail in FIG. 2, and will be described further herein. Generally, the VCS 20 is configured to connect or pair with any suitable mobile telephone 30 (see FIG. 1) present within the vehicle 10. The mobile telephone 30 can be any suitable mobile electronic device that has voice communication capabilities, and is thus illustrated as a mobile telephone, and specifically a mobile smartphone, for exemplary purposes only. The mobile telephone 30 can thus be any device that has voice communication capabilities, such as any suitable smartphone, tablet computer, laptop computer, or wearable smart device, for example.

When the mobile telephone 30 is present within the vehicle 10, the mobile telephone 30 is paired with the VCS 20 in any suitable manner, such as with a Bluetooth connection or any other suitable wireless or wired connection. Telephone calls received by the mobile telephone 30 can be conducted through the VCS 20 and a data communication module (DCM) 50 thereof. For example, audio of the telephone call can be broadcast over speakers within the vehicle 10, such as the speakers of the audio system of the vehicle 10. Thus the user of the mobile telephone 30 and other occupants of the vehicle 10 can hear the voice of the person on the other end of the telephone call through the audio speakers of the vehicle 10. The VCS 20 can include a microphone mounted within the vehicle 10 at any location suitable to pick up the voice of the user of the mobile telephone 30.

As referred to herein, the "user" of the mobile telephone 30 generally refers to the owner or person holding the cellular telephone subscription associated with the mobile telephone 30 for which a telecommunications server 40 includes a user profile. However, the present teachings are also applicable to use of the mobile telephone 30 by any person other than the subscriber as well, and thus the term "user" also encompasses nonsubscribers.

The mobile telephone 30 communicates with a telecommunications server 40 belonging to or associated with the telecommunications company that the owner of the mobile telephone 30 has subscribed to. Thus the telecommunications server 40 includes a profile belonging to the owner of the mobile telephone 30. The profile includes information relevant to the account of the owner, such as name, mobile telephone number, and any other relevant information, such as home address, office address, home landline phone number, and office phone number.

The telecommunications server 40 can be housed at any suitable location, such as at a telecommunications company site 42. The telecommunications company site 42 can be a site belonging to or associated with any suitable telecommunications company, such as, but not limited to, AT&T, Verizon, T-Mobile, Sprint, U.S. Cellular, etc. Thus when the mobile telephone 30 is present within the vehicle 10 and paired with the VCS 20, the VCS 20 and DCM 50 thereof merely uses the audio system of the vehicle 10 to broadcast audio of the telephone call throughout the vehicle 10, which is received directly from the mobile telephone 30 via a Bluetooth connection, or any other suitable connection. The VCS 20 also picks up the voice of the user within the vehicle 10 with a microphone mounted within the vehicle 10. The audio from the microphone is input to the mobile telephone 30, such as by the Bluetooth connection, for transmission by the mobile telephone 30 to the telecommunications server 40 handling the telephone call.

Figure 2:
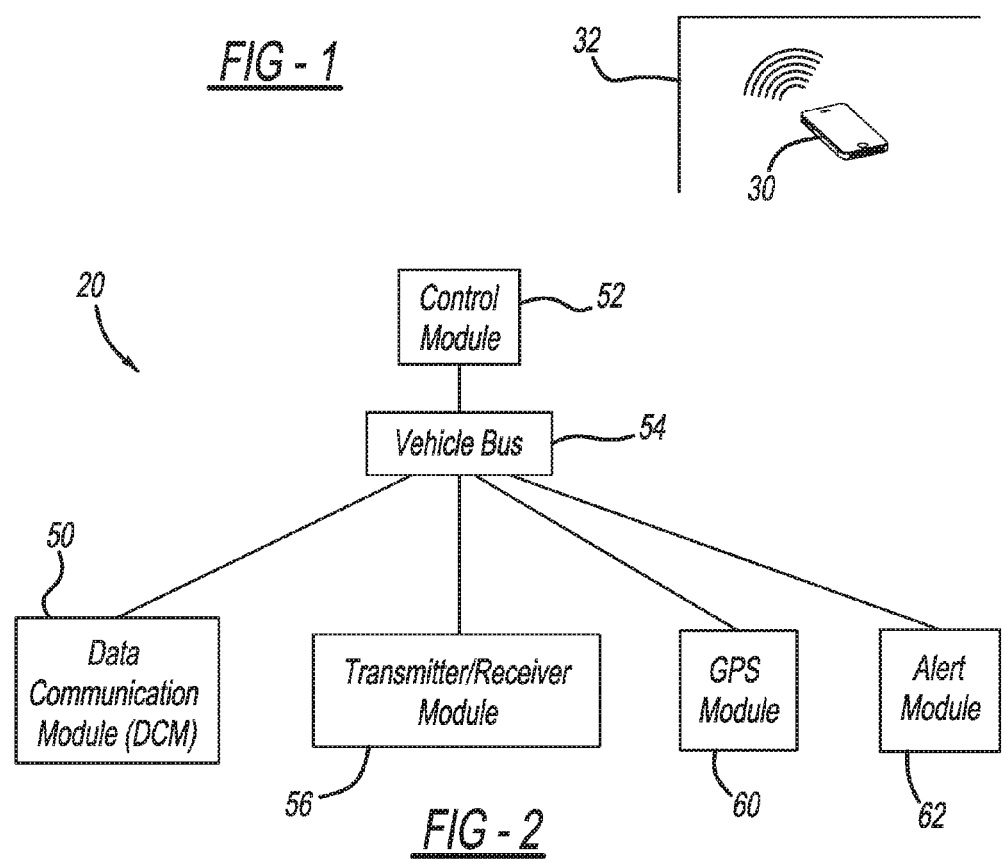
FIG. 2 is a block diagram of the communication system according to the present teachings.

With reference to FIG. 2, the vehicle communication system 20 generally includes the data communication module (DCM) 50. The DCM 50 is controlled by a control module 52. A vehicle bus 54 connects the data communication module 50 and the control module 52. The VCS 20 further includes a transmitter/receiver module 56, a global positioning system (GPS) module 60, and an alert module 62, each of which is controlled by the control module 52 and connected to the control module 52 with the vehicle bus 54. The vehicle bus 54 can be any suitable communications network onboard the vehicle 10 suitable for connecting the DCM 50, the transmitter/receiver module 56, the GPS module 60, and the alert module 62 to the control module 52 for control thereby. The vehicle bus 54 can use any suitable communications protocol, and thus can include a controller area network (CAN), local interconnect network (LIN), or any other suitable communications network.

Throughout the present teachings the term "module" or the term "controller" may be replaced with the term "circuit," for example The terms "module" and "controller" may refer to, be part of, or include processor hardware (shared, dedicated, or group) that executes code and memory hardware (shared, dedicated, or group) that stores code executed by the processor hardware. The code is configured to provide the features of the modules, controllers, methods, and systems described herein.

The DCM 50 can be any suitable controller or processor hardware configured to execute code, and can include memory hardware that stores code for execution by the controller/processor hardware. The code is configured to provide the features of the DCM 50 described herein. For example, the DCM 50 is configured to detect the presence of the mobile telephone 30 within the vehicle 10, and pair with the mobile telephone 30. When the mobile telephone 30 is present within the vehicle 10 and paired with the DCM 50, the user of the mobile telephone 30 can place and receive telephone calls using the VCS 20 and the DCM 50 thereof, as described above. When the mobile telephone 30 is not present in the vehicle 10 and is not paired with the DCM 50 (i.e., the mobile telephone 30 is at a location 32 (FIG. 1) remote to the vehicle 10, such as when the user forgets his/her mobile telephone 30 at home or the office) the DCM 50 is configured to instruct the telecommunications server 40 to forward calls made to the mobile telephone 30 to the DCM 50.

The DCM 50 is configured to transmit and receive data to and from the telecommunications server 40 by way of the transmitter/receiver module 56. The transmitter/receiver module 56 includes a transmitter/receiver antenna 58 mounted to the vehicle 10. The transmitter/receiver antenna 58 can be any suitable transmitter and receiver, such as any suitable radio frequency (RF) transmitter/receiver antenna, which is configured to communicate with the telecommunications server 40. The transmitter/receiver module 56 is configured to communicate with the telecommunications server 40 using any suitable telecommunications protocol, such as any suitable cellular or mobile network communications protocol.

The transmitter/receiver 58 may also be a GPS receiver configured for use by the GPS module 60. Specifically, the GPS module 60 is configured to identify the GPS coordinates of the vehicle 10 based on GPS satellite signals received by the receiver 58. The GPS module 60 can be any suitable GPS module configured to identify location of the vehicle 10. The GPS module 60 can be any conventional GPS module.

The alert module 62 is configured to generate an alert when the mobile telephone 30 is not present within the vehicle 10 at the time the vehicle communication system 20 is activated, which typically occurs when the vehicle 10 is first powered on, such as when the user enters the vehicle, or when the ignition system of the vehicle is started, or power to vehicle accessories (including the vehicle communication system) is activated. The alert module 62 may be configured to generate any suitable alert to notify the user that his/her mobile telephone 30 is not present in the vehicle 10. For example, the alert module 62 may be configured to sound any suitable alarm or alert tone, as well as display any suitable visual alert, such as on a display screen of an instrument cluster of the vehicle 10 and/or a center stack of the vehicle 10.

When the DCM 50 determines that the mobile telephone 30 is not present within the vehicle 10, such as when the DCM 50 is unable to pair with the mobile telephone 30, the DCM 50 is configured to instruct the telecommunications server 40 to forward calls made to the user's mobile telephone 30 to the vehicle 10. Specifically, the data communication module 50 instructs the telecommunications server 40 to forward the calls wirelessly for receipt by the transmitter/receiver antenna 58 of the transmitter/receiver module 56. Upon receipt, the data associated with the telephone call, including audio data, is routed by the control module 52 to the DCM 50 by way of the vehicle bus 54. The DCM 50 converts the audio data and broadcasts the audio of the call throughout the vehicle 10, such as by using the speakers of the audio system of the vehicle 10.

The user can also use the VCS 20 to place a telephone call when the mobile telephone 30 is not paired with the VCS 20. For example, using any suitable interface of the VCS 20, such as vehicle center stack controls, steering wheel controls, voice commands, etc., the user may place a call as he/she normally would when the mobile telephone 30 is paired with the VCS 20. The DCM 50 will then transmit details of the call to the telecommunications server 40, such as the telephone number that the user input to call. The DCM 50 will then instruct the telecommunications server 40 to connect the call using the user's profile saved at the telecommunications server 40. As a result, the caller ID of the person being called will display the telephone number of the user's mobile telephone 30 so the user can be recognized. Additional features and functionality of the DCM 50 and the other components of the VCS 20 will be described in further detail below in connection with the description of method 110 of FIGS. 3A and 3B.

Figure 3A:
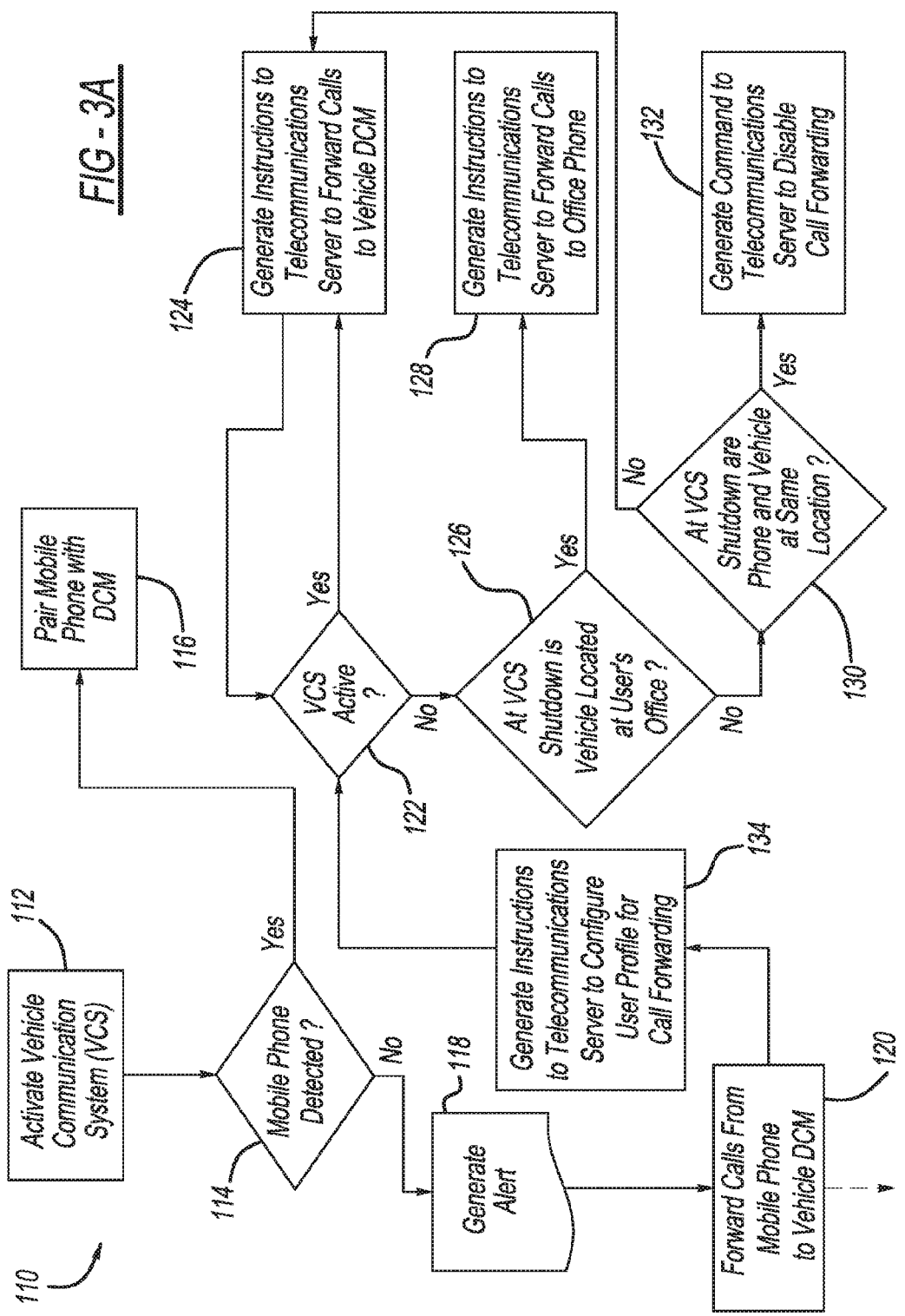
FIG. 3A illustrates a first portion of a method according to the present teachings for placing and receiving calls with the communication system according to the present teachings.
Figure 3B:
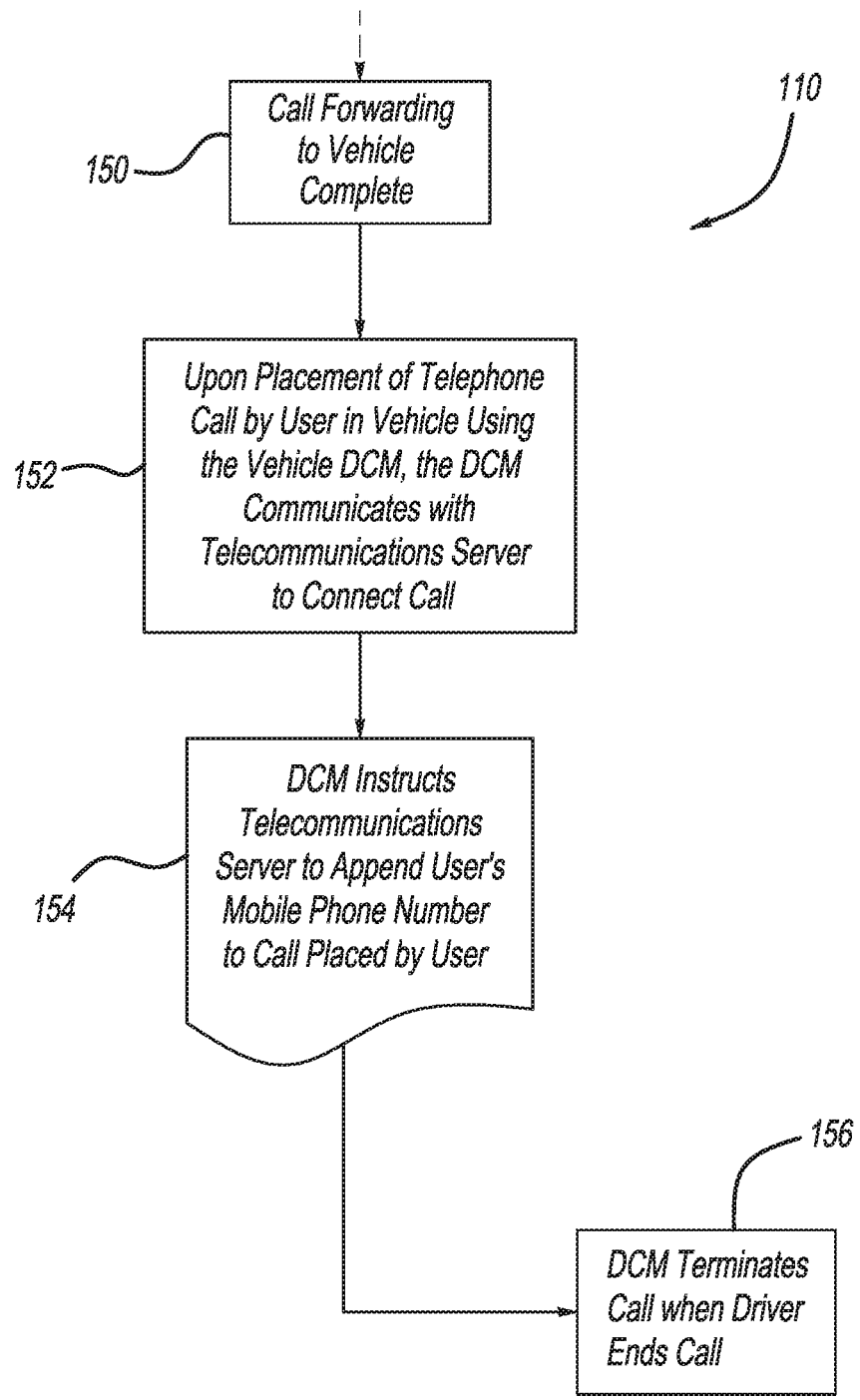
FIG. 3B illustrates a second portion of the method of FIG. 3A.

With reference to FIGS. 3A and 3B, a method for placing and receiving calls from the vehicle 10 (or any other suitable vehicle or structure) when the user's mobile telephone 30 is not present within the vehicle 10, but is instead at the remote location 32, is generally illustrated at reference numeral 110. The method 110 is described herein as being carried out using the vehicle communication system 20, but this is for exemplary purposes only because the method 110 can be carried out using any other suitable system or device(s).

The method 110 begins at block 112, where the VCS 20 is activated. The VCS 20 can be activated at any suitable time, such as when the vehicle 10 is powered on. The vehicle 10 can be powered on at any suitable time, such as when a person with a key fob for the vehicle 10 approaches the vehicle 10, when the vehicle 10 is unlocked, when the vehicle 10 is started remotely, when an accessory power system of the vehicle 10 is started, when the engine is started, when electric or hybrid powertrain is started, etc.

At block 114, the DCM 50 determines whether the mobile telephone 30 is present within the vehicle 10. The DCM 50 can do this in any suitable manner, such as by attempting to pair with the mobile telephone 30. If the DCM 50 determines that the mobile telephone 30 is present within the vehicle 10, at block 116 the DCM 50 will pair with the mobile telephone. Once the mobile telephone 30 is paired with the DCM 50, the user of the mobile telephone 30 will be able to access the mobile telephone 30 through the DCM 50 in order to place and receive telephone calls. The mobile telephone 30 will communicate with the telecommunications server 40 at the telecommunications company 42 using any suitable cellular connection, as is known in the art.

If at block 114 the DCM 50 does not detect the mobile telephone 30 within the vehicle 10, the DCM 50 will so inform the control module 52 through the vehicle bus 54. The control module 52 will then activate the alert module 62 at block 118. The alert module 62 will then generate any suitable alert to inform the driver or other occupants of the vehicle 10 that the mobile telephone 30 is not present within the vehicle 10. The alert can be any suitable alert, such as any suitable audible and/or visual alert.

When the mobile telephone 30 is not present within the vehicle 10, the method proceeds to block 120 where the VCS 20 operates to forward calls from the mobile telephone 30 to the vehicle DCM 50. Specifically and with reference to block 134, the DCM 50 generates a command or instructions to the telecommunications server 40 to configure the user's profile to direct calls made to the phone number assigned to the mobile telephone 30 to the DCM 50 of the vehicle 10, not to the mobile telephone 30 itself. The instructions are transmitted to the telecommunications server 40 by the transmitter/receiver module 56 and the transmitter/receiver antenna 58 thereof.

With reference to block 122, when the vehicle communication system 20 is active, the vehicle DCM 50 generates instructions to the telecommunications server 40 to forward telephone calls to the vehicle DCM 50 at block 124. As a result, the user within the vehicle 10 will be able to receive and place telephone calls using the DCM 50 even though the mobile telephone 30 is not present within the vehicle 10. This advantageously allows the user to make and receive telephone calls even though he or she may have forgotten to bring the mobile telephone 30 into the vehicle 10. The user will be able to use the DCM 50 to make and receive telephone calls in the same manner as if the mobile telephone 30 was present within the vehicle 10. Specifically, the user will be able to hear the voice on the other end of the call through the audio speaker(s) of the vehicle 10, and will be able to talk to the other person using a microphone mounted within the vehicle 10.

If at block 122 the VCS 20 is not active, the method 110 proceeds to block 126. Just prior to shutdown of the VCS 20, the location of the vehicle 10 as determined by the GPS module 60 is stored by the control module 52. The control module 52 can also include other addresses relevant to the user, such as the user's home or office addresses, which the user will have previously input into the control module 52 for storage therein. The control module 52 will compare the location of the vehicle 10 last stored by the GPS module 60 with previous locations stored by the user of the mobile telephone 30. If at block 126 the last location stored is the user's office, for example, prior to shutdown of the VCS 20 the DCM 50 will instruct the telecommunications server 40 to forward calls from the mobile telephone 30 to the user's office phone, as set forth at block 128. At blocks 126 and 128, the calls can be forwarded to any other suitable location as well. For example, if at block 126 the vehicle 10 is at the user's home, the calls can be forwarded to the user's house landline at block 128.

If the last location of the vehicle 10 as determined by the GPS module 60 is the same location as the mobile telephone 30 based on GPS signals from the mobile telephone 30 or triangulation off of cellular towers (see block 130), the DCM 50 will generate instructions to the telecommunications server 40 instructing the telecommunications server 40 to disable call forwarding at block 132 and route calls to the number of the mobile telephone 30 back to the mobile telephone 30 itself.

With reference to FIG. 3B, after the DCM 50 has instructed the telecommunications server 40 to forward calls to the DCM 50 at block 150, the user will be able to initiate a telephone call from the vehicle 10 at block 152 even though the mobile telephone 30 is not present within the vehicle 10. Specifically, upon use of the DCM 50 to place a telephone call, the DCM 50 communicates with the telecommunications server 40 by way of the transmitter/receiver module 56 and the transmitter/receiver antenna 58, to connect the call using the profile of the user. The user will then be able to carry out the call using the DCM 50 and controls associated therewith (such as steering wheel controls, dashboard controls, centerstack controls, overhead controls, voice commends, etc.), even though the mobile telephone 30 is not present within the vehicle 10. At block 154, the DCM 50 instructs the telecommunications server 40 to append the mobile telephone number of the user's mobile telephone 30 to the call data based on the user's stored profile, so that the phone number of the mobile telephone 30 will appear on the caller ID of the person being called. At block 156, the DCM 50 will terminate the call when the user ends the call, such as by pressing an "end call" button of controls associated with the DCM 50.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle communication system comprising:
   a data communication module (DCM) that, upon detecting that a user's mobile telephone is not present onboard a vehicle due to failure of the DCM to pair with the user's mobile telephone that was previously registered with the DCM, is configured to wirelessly communicate with a telecommunications server:
      instruct the telecommunications server to forward calls made to the user's mobile telephone to the DCM of the vehicle; and
      instruct the telecommunications server to connect a telephone call that has been initiated by the user at the vehicle using the DCM of the vehicle; and
   an alert module configured to generate an alert to the user indicating that the user's mobile telephone is not present in the vehicle;
   wherein the DCM is configured to detect whether the user's mobile telephone is present in the vehicle;
   wherein upon the DCM detecting that the user's mobile telephone is not present in the vehicle due to failure of the DCM to pair with the user's mobile telephone that was previously registered with the DCM, the controller is configured to activate the alert module to generate the alert to the driver; and
   wherein after the telephone call is complete the DCM is configured to instruct the telecommunications server to terminate the telephone call.

2. The vehicle communication system of claim 1, wherein the telecommunications server is remote to the vehicle.

3. The vehicle communication system of claim 1, wherein the DCM is further configured to instruct the telecommunications server to forward calls made to the user's mobile telephone to the user's work telephone when GPS data at shutdown of the vehicle communication system indicates that the vehicle is at the user's office.

4. The vehicle communication system of claim 1, wherein the DCM is further configured to instruct the telecommunications server to disable call forwarding when GPS data at shutdown of the vehicle communication system indicates that the vehicle and the user's mobile telephone are at the same location so that calls placed to the user's telephone number are directed to the user's mobile telephone.

5. The vehicle communication system of claim 1, wherein the mobile telephone is a mobile device including voice communication capabilities, the mobile device is any one of a smart phone, tablet computer, laptop computer, and wearable smart device.

6. The vehicle communication system of claim 1, wherein the DCM is further configured to instruct the telecommunications server to append a telephone number of the user's mobile telephone to the telephone call initiated by the user at the vehicle using the DCM when the user's mobile telephone is not present onboard the vehicle.

7. The vehicle communication system of claim 1, wherein the DCM is further configured to instruct the telecommunications server to terminate the telephone call initiated by the user when the user instructs the DCM to terminate the telephone call.

8. The vehicle communication system of claim 1, wherein the DCM is further configured to:

pair with the mobile telephone when the mobile telephone is present in the vehicle; and receive and initiate telephone calls using the mobile telephone when the mobile telephone is present in the vehicle and paired.

9. The vehicle communication system of claim 1, wherein the DCM is further configured to instruct the telecommunications server to connect the telephone call using a profile belonging to the user and stored at the telecommunications server.

10. A method for placing and receiving calls with a data communication module (DCM) of a vehicle communication system that is configured to wirelessly communicate with a telecommunications server, the method comprising:

determining whether a user's mobile telephone, which has been previously registered with the DCM, is present onboard the vehicle;

instructing the telecommunications server to forward calls made to the user's mobile telephone to the DCM of the vehicle, when the user's mobile telephone is determined to not be present onboard the vehicle due to failure of the DCM to pair with the user's mobile telephone that was previously registered with the DCM;

instructing the telecommunications server to connect a telephone call that has been initiated by the user at the vehicle using the DCM of the vehicle;

activating an alert module of the vehicle communication system to alert the user that the user's mobile telephone is not present in the vehicle when the DCM determines that the user's mobile telephone is not present in the vehicle due to failure of the DCM to pair with the user's mobile telephone that was previously registered with the DCM; and instructing the telecommunications server to terminate the telephone call after the telephone call is complete.

11. The method of claim 10, wherein said instructing the telecommunications server to forward calls is performed using the DCM.

12. The method of claim 10, wherein said instructing the telecommunications server to connect the telephone call is performed using the DCM.

13. The method of claim 10, further comprising instructing the telecommunications server to forward calls made to the user's mobile telephone to the user's work telephone when GPS data at shutdown of the vehicle communication system indicates that the vehicle is at the user's office.

14. The method of claim 10, further comprising instructing the telecommunications server to disable call forwarding when GPS data at shutdown of the vehicle communication system indicates that the vehicle and the user's mobile telephone are at the same location so that calls placed to the user's telephone number are directed to the user's mobile telephone.

15. The method of claim 10, wherein the mobile telephone is a mobile device including voice communication capabilities, the mobile device is any one of a smart phone, tablet computer, laptop computer, and wearable smart device.

16. The method of claim 10, further comprising transmitting an instruction from the DCM to the telecommunications server instructing the telecommunications server to append a telephone number of the user's mobile telephone to the telephone call initiated by the user at the vehicle using the DCM when the user's mobile telephone is not present onboard the vehicle.

17. The method of claim 10, further comprising transmitting instructions from the DCM to the telecommunications server to terminate the telephone call initiated by the user when the user instructs the DCM to terminate the telephone call.

18. The method of claim 10, further comprising:

pairing the mobile telephone with the DCM when the mobile telephone is present in the vehicle; and receiving and initiating telephone calls using the mobile telephone when the mobile telephone is present in the vehicle.

* * * * *